US007375316B2

(12) United States Patent
Yamada et al.

(10) Patent No.: US 7,375,316 B2
(45) Date of Patent: May 20, 2008

(54) MASS SPECTROMETER AND MASS SPECTROMETRY

(75) Inventors: Masuyoshi Yamada, Ichikawa (JP); Masao Suga, Hachioji (JP); Izumi Waki, Tokyo (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 11/712,922

(22) Filed: Mar. 2, 2007

(65) Prior Publication Data

US 2007/0181802 A1 Aug. 9, 2007

Related U.S. Application Data

(62) Division of application No. 11/699,366, filed on Jan. 30, 2007.

(30) Foreign Application Priority Data

Feb. 8, 2006 (JP) ............................ 2006-031585

(51) Int. Cl.
*H01J 49/00* (2006.01)
*H01J 3/07* (2006.01)
*B01D 59/44* (2006.01)

(52) U.S. Cl. ...................... 250/285; 250/281; 250/282; 250/288

(58) Field of Classification Search ................ 250/285, 250/281, 282, 288
See application file for complete search history.

(56) References Cited

U.S. PATENT DOCUMENTS 6,489,610 B1 * 12/2002 Barofsky et al. ........... 250/287
2007/0181800 A1 * 8/2007 Jolliffe et al. ............... 250/288

FOREIGN PATENT DOCUMENTS

| | | |
|---|---|---|
| JP | 9-15207 | 6/1995 |
| JP | 11-307041 | 4/1998 |
| JP | 2001-93461 | 9/1999 |
| JP | 2000-357488 | 4/2000 |
| JP | 2006-86002 | 9/2004 |

* cited by examiner

*Primary Examiner*—Nikita Wells
(74) *Attorney, Agent, or Firm*—Reed Smith LLP; Stanley P. Fisher, Esq.; Juan Carlos A. Marquez, Esq.

(57) ABSTRACT

A mass spectrometer capable of measuring under switching two ion sources at different pressure levels in which a sample gas separated by GC column is branched, and separately introduced to a first ion source (for example, APCI ion source) and a second ion source (for example, EI ion source) at a pressure level lower than that of the first ion source respectively. Preferably, the flow rate of the sample gas introduced to the APCI ion source is made more than the flow rate of the sample gas introduced to the EI ion source, so that the pressure for each of the ion sources can be maintained and analysis can be conducted by each ionization at a good balance in view of the sensitivity.

8 Claims, 9 Drawing Sheets

MASS SPECTROMETER AND MASS SPECTROMETRY

CROSS-REFERENCE TO RELATED APPLICATION

This application is a Divisional application of U.S. application Ser. No. 11/699,366 filed Jan. 30, 2007. Priority is claimed based on U.S. application Ser. No. 11/699,366 filed Jan. 30, 2007, which claims the priority of Japanese Patent Application No. 2006-031585 filed on Feb. 8, 2006, all of which is incorporated by reference.

FIELD OF THE INVENTION

The present invention concerns a mass spectrometer for analyzing a sample separated by gas chromatography and mass spectrometry using the same.

BACKGROUND OF THE INVENTION

In the specification, relevant terms used are abbreviated for gas chromatography as GC, liquid chromatography as LC, mass spectrometer as MS, apparatus combining gas chromatography and mass spectrometer as GC/MS, atmospheric pressure chemical ionization as APCI, chemical ionization as CI, electron impact as EI, and electro-spray ionization as ESI, respectively.

GC/MS is a well known analysis technology. APCI/MS is an apparatus for ionizing and detecting micro-amount of ingredients in a mixed sample at high sensitivity by using ion-molecular reaction, which is utilized for the analysis of micro-ingredients in environmental samples and bio-samples. JP-A No. 9-15207 discloses an analyzer at high sensitivity combining GC and APCI/MS for conducting analysis of various kinds of micro-impurities containing special gases for use in semiconductor production. In the apparatus, a sample gas separated by the column of GC is introduced in admixture with a carrier gas by way of a line to an APCI source and analyzed. JP-A No. 11-307041 discloses an apparatus in which a first ionization chamber for CI, a second ionization chamber for EI, and a mass analysis part are serially in adjacent with each other, and a passage port for passing ions is disposed between each of the ion sources. The sample gas enters the first ionization chamber and is introduced through the passage port into the second ionization chamber. During CI operation, the sample gas is ionized in a state of stopping the EI operation. During EI operation, the sample gas is ionized in a state of stopping the CI operation, and the introduced samples are analyzed by switching the two ion sources. JP-A No. 2000-357488 discloses an apparatus of separating ingredients flown out of LC by a branching tee and delivering the same to two ion sources of ESI and APCI. By switching the ion sources, they can be analyzed by two ionization methods. Further, JP-A No. 2001-93461 discloses a constitution of improving the sensitivity by making the gas flow different from the ion moving direction in APCI ionization by corona discharge using a needle electrode.

SUMMARY OF THE INVENTION

Analysis by GC/MS is suitable to separation and analysis of plural ingredients, particularly, ingredients of high volatility in a mixed sample. Generally, the ion source used for GC/MS includes an EI ion source. For the mass spectra obtained by EI ionization, spectrum patterns for fragment ions are open to public by data bases and information for molecular structures can be obtained. The EI source conducts ionization under a vacuum of about $10^{-3}$ Torr or less.

On the other hand, in a case of using APCI as the ion source, ionization of a sample is conducted at an atmospheric pressure and a differential pumping part is provided for transporting ions from the ion source at the atmospheric pressure to a mass analysis part under vacuum. Ions from the ion source are introduced by way of an ion introduction aperture of about 0.1 mm to 0.5 mm diameter into a vacuum part. In a case of using corona discharge for the ion source of APCI, it is necessary to flow a gas (primary ion generating gas (discharge gas)) at a flow rate of about 0.1 L/min to 1 L/min for stable maintenance of discharge to the ion source. Since the mass spectrum by APCI ionization mainly has molecular ion peaks, mass information for molecule can be obtained easily.

In JP-A No. 9-15207, a sample gas separated by the column of GC is analyzed only by the APCI ion source. In JP-A No. 11-307041, since the introduction port for the sample gas is restricted to the ion passage port for the ion source for CI, it is difficult to introduce the sample gas to a position where the ionization efficiency is higher in the EI ion source during EI operation. Further, since the pressure in the ionization chamber for CI (0.1 to 1 Torr) and the pressure in the ionization chamber for EI ($10^{-3}$ Torr or less), are different, there is a problem that the high vacuum in the EI ionization chamber can not be maintained unless the introduction port between both of the ionization chambers is sufficiently small, but passage of ions through the introduction port becomes difficult during CI operation as the introduction port is smaller. While JP-A No. 2000-357488 describes a method of analyzing by two types of ionization methods (APCI and ESI) used substantially at an atmospheric pressure, it does not disclose a method of analyzing a sample gas separated by a single column by switching plural ion sources where the pressure levels are different greatly.

The invention intends to provide a mass spectrometer having a constitution of switching two ion sources at different pressure levels such as between APCI and EI, CI and EI, and APCI and CI, and provide GC-APCI/EI mass spectrometer and mass spectrometry capable of collecting a large amount of information for identifying unknown ions by using the spectrometer.

In the mass spectrometer of the invention, a sample gas separated by a GC column is branched, and introduced separately to a first sample ion source (for example, APCI ion source) and a second sample ion source at a pressure level lower than that of the first ion source (for example, EI ion source) respectively.

Further, the flow rates of a sample gas introduced to respective sample ion sources are controlled such that the flow rate of a sample gas introduced to the first sample ion source is more than the flow rate of a sample gas introduced into the second sample ion source and the pressure for each of the sample ion sources can be maintained, and analysis by respective ionization can be conducted at a good balance in view of sensitivity.

In one of embodiments of the invention, an APCI ion source and an EI ion source are disposed serially to a mass spectrometric part and analysis can be conducted at high sensitivity by respective ionization methods by connecting branched columns separately to the two ion sources. In another embodiment, by changing the length of the branched column, the time in which the separated ingredient is introduced to the APCI ion source and the time in which the separated identical ingredient is introduced to the EI ion source are shifted.

With such a constitution, in a case of analyzing a sample where plural ingredients are mixed, it is possible to previously measure the ingredients separated by the GC column successively by APCI ionization, APCI ionization is switched to EI ionization at the instance an unidentifiable unknown ingredient is observed, and analyze the identical unknown ingredient introduced with a time delay to the EI ion source by EI ionization. As described above, by obtaining two kinds of information, that is, the mass information by APCI ionization and the molecular structure information by EI ionization in one measurement, rapid identification can be conducted.

According to the invention, mass spectra by two ion sources at different pressure levels can be obtained in one measurement and rapid identification can be conducted for unknown ingredients by obtaining more information.

DESCRIPTION OF THE ACCOMPANYING DRAWINGS

DESCRIPTION OF PREFERRED EMBODIMENTS

The present invention is to be described by way of preferred embodiments. While description is to be made to an example of using an APCI ion source as a first ion source and an EI ion source as a second ion source, the invention is applicable also to a combination of two types of ion sources such as a case where the first ion source is CI and the second ion source is EI or a case where the first ion source is APCI and the second ion source is CI in which the pressure in the ionization chamber of a second ion source is lower than the pressure in the ionization chamber of a first ion source.

Figure 1:
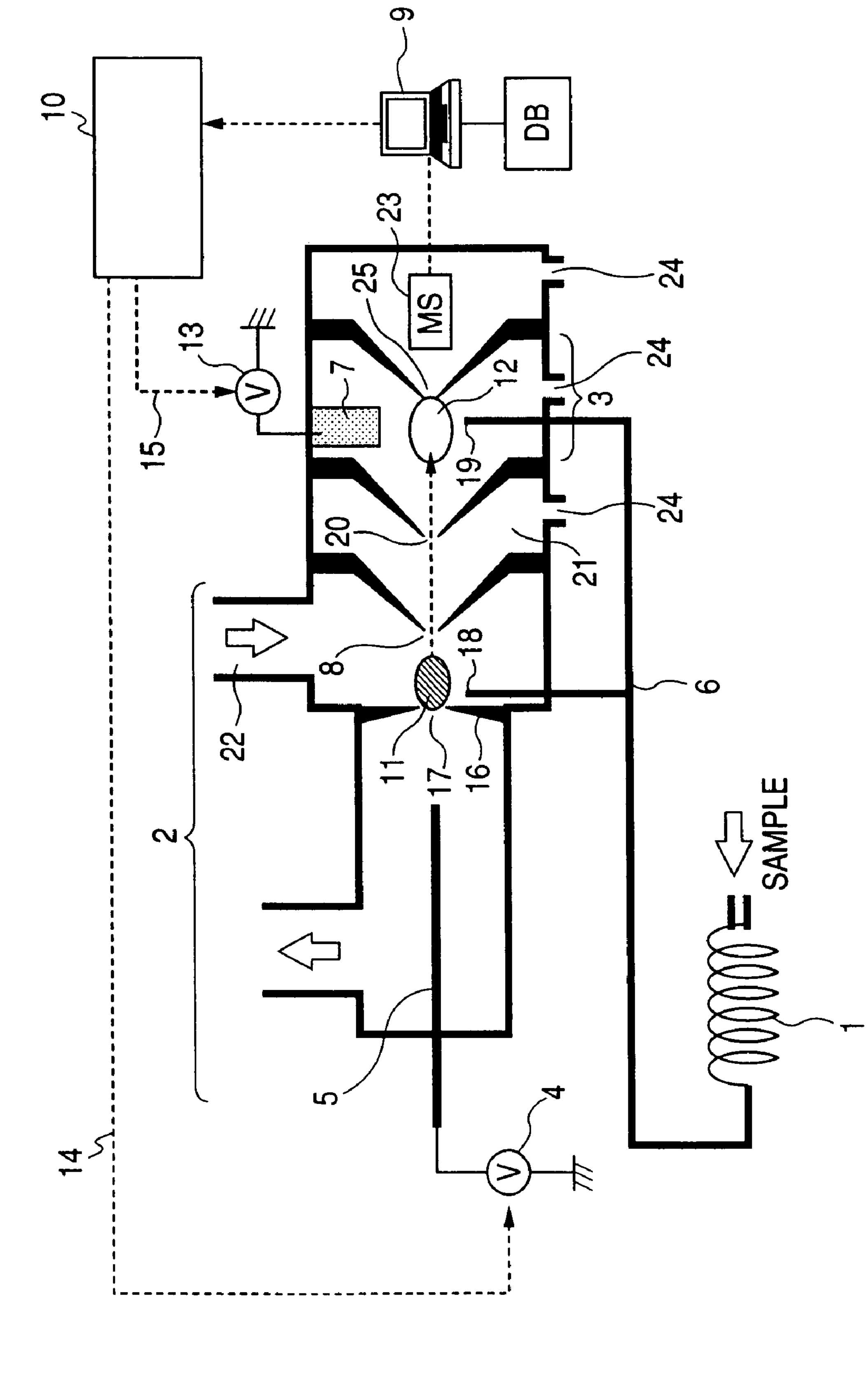
FIG. 1 is a schematic view showing an example of the constitution for a mass spectrometer according to the invention.

FIG. 1 is a schematic view showing an example of a GC-APCI/EI-MS apparatus according to the invention. A sample is introduced to upstream of a GC column 1, and each of ingredients in the sample is separated by the GC column 1. The sample gas flowing from the GC column 1 is bisected at a tee 6. The separated sample gases are introduced respectively to an APCI ion source 2 and an EI ion source 3. The APCI ion source 2 and the EI ion source 3 are separated by a mid-differential pumping part 21 formed with an aperture 8 and an aperture 20. The mid differential pumping part 21 and the EI ion source 3 are exhausted by a vacuum pump from exhaust ports 24. The APCI ion source 2 may adopt corona discharge using a needle electrode 5 as shown in FIG. 1, or may adopt a radiation source. Description is to be made to a case of using corona discharge. For stably maintaining discharge, discharge gas (air, etc.) is introduced at about 0.5 to 1.0 l/min to the APCI ion source 2. The discharge gas flows from the forward to the top end of the needle electrode 5 in FIG. 1, but the discharge gas may flow from the base to the top end of the needle electrode 5.

In a case of using a dry air for the discharge gas, primary ions ($N_2^+$ or $N_4^+$) are generated by the reactions shown in the following equations (1) or (2) (refer to The Journal of Chemical Physics, Vol. 53, pp. 212 to 229 (1970)).

$$N_2 \rightarrow N_2^+ + e^- \quad (1)$$

$$N_2^+ + 2N_2 \rightarrow N_4^+ + N_2 \quad (2)$$

A lead-out electrode 16 has a primary ion introduction aperture 17 of about 2 mm diameter through which generated primary ions are introduced by an electric field to an APCI ion source 11. In the APCI ion source 11, the primary ions generated by corona discharge and the sample gas introduced from the end 18 at the exit of the GC column are reacted (ion-molecule reaction), to generate ions of the sample gas (secondary ions: sample ions). The generated sample ions are introduced by way of apertures 8, 20, and 25 into a mass spectrometric part 23 and analyzed.

Figure 9:
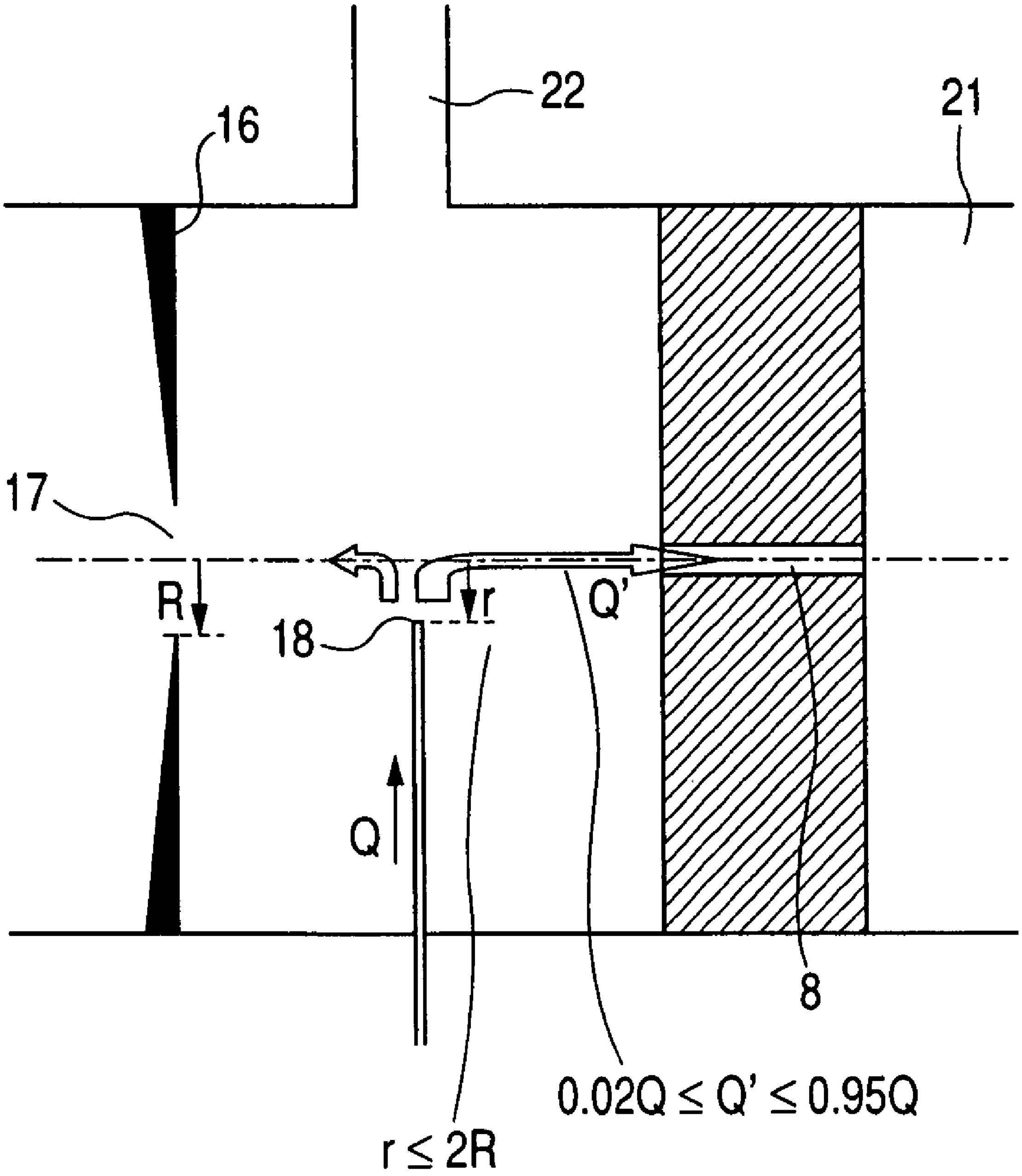
FIG. 9 is a constitutional view for the inside of an APCI ion source.

The sample gas introduced to the APCI ion source 2 is directly introduced from the end 18 of the GC column to the APCI ion source 11 from a position near the axis connecting the center for the primary ion introduction aperture 17 through which the primary ions pass and the center for the aperture 8 through which the sample ions move. As shown in FIG. 9, assuming the radius for the primary ion introduction aperture 17 as R and a distance from the axis connecting the center for the primary ion introduction aperture 17 and the center for the aperture to the center for the opening at the end of the GC column is r, the center for the opening of the end 18 of the GC column is situated at a position with a substantially equal distance from the center for the ion exit of the primary ion introduction aperture 17 and that from the center for the ion inlet of the sample ion moving aperture 8 and capable of satisfying: $r \leqq 2R$. By satisfying the condition, since the staying time in which the primary ions introduced from the primary ion introduction aperture 17 and the sample gas introduced from the end of the GC column are present together can be made longer and a sufficient time to proceed ion-molecule reaction can be ensured, high sensitivity can be obtained.

In a case where the center for the opening 18 at the end of the GC column approaches excessively to the aperture 18, a substantially entire amount of the sample gas is exhausted from the sample ion moving aperture 8. Since, the staying time in which the primary ions and the sample molecules are present together in the field of ion-molecule reaction is shortened and sufficient time to proceed the ion-molecule reaction can not be ensured, the amount of the generated sample ions is lowered to lower the sensitivity. On the other hand, in a case where the center for the opening 18 at the end of the GC column approaches excessively to the primary ion introduction aperture 17, a substantially entire amount of the sample gas is exhausted from the primary ion introduction aperture 17. Also in this case, since the sample gas is exhausted, while not being ionized, from the primary ion introduction port 17, the staying time in which the primary ions and the sample molecules are present together in the field of ion-molecule reaction is shortened in the same manner as described above, sufficient time to proceed the ion-molecule reaction can not be ensured, the amount of generated sample ions is decreased and the sensitivity is lowered.

That is, for attaining a high sensitivity, the center for the opening 18 at the end of the GC column is situated at a position between the primary ion introduction aperture 17 and the aperture 18 where the sample gas introduced from the opening 18 at the end of the GC column is exhausted at a good balance from the primary ion introduction aperture 17 and the aperture 8, by which the staying time where the primary ions and the sample molecules are present together in the field of ion-molecule reaction is made sufficiently long to ensure a sufficient time to proceed the ion-molecule reaction and the amount of the generated sample ions can be increased to improve the sensitivity.

Assuming the flow rate of the sample gas flowing through the opening 18 at the end of the GC column as Q, and the flow rate in Q that is exhausted by way of the aperture 8 to the mid-differential pumping part 21 as Q', it is preferred that the central position for the opening 18 at the end of the GC column in the direction of the axis shown by a dotted chain in FIG. 9 is controlled so as to satisfy: $0.02Q \leqq Q' \leqq 0.95Q$ and, further, the central position for the opening 18 is controlled to a position: $r \leqq 2R$ near the axis shown by the dotted chain where the concentration of the primary ions is high.

In the EI ion source 3, electrons emitted from an electron generation device (filament 7) disposed in the ion source collide against the sample molecules introduced from the end 19 at the exit of the GC column to cause ionization. It is preferred that the end 19 at the exit of the GC column is situated near the axis connecting the aperture 20 and the aperture 25.

The APCI ion source and the EI ion source are switched by a signal from a controller 10. In a case of APCI ionization, a signal 14 is sent so as to turn-on the power source 4 for the needle electrode and a signal 15 is sent so as to turn-off a filament power source 13 for the EI ion source. In a case of EI ionization, the power source 4 for the needle electrode is turned-off and the filament power source 13 is turned-on.

Ingredients ionized by APCI or EI are analyzed in the mass spectrometric part 23 and indicated or stored as mass spectra in the data collection part 9 or stored. The mass spectrometer that can be used includes, for example, quadrupole mass spectrometer, ion trap mass spectrometer, ion trap TOF (Time of Flight) mass spectrometer, and magnetic sector type mass spectrometer.

Figure 2:
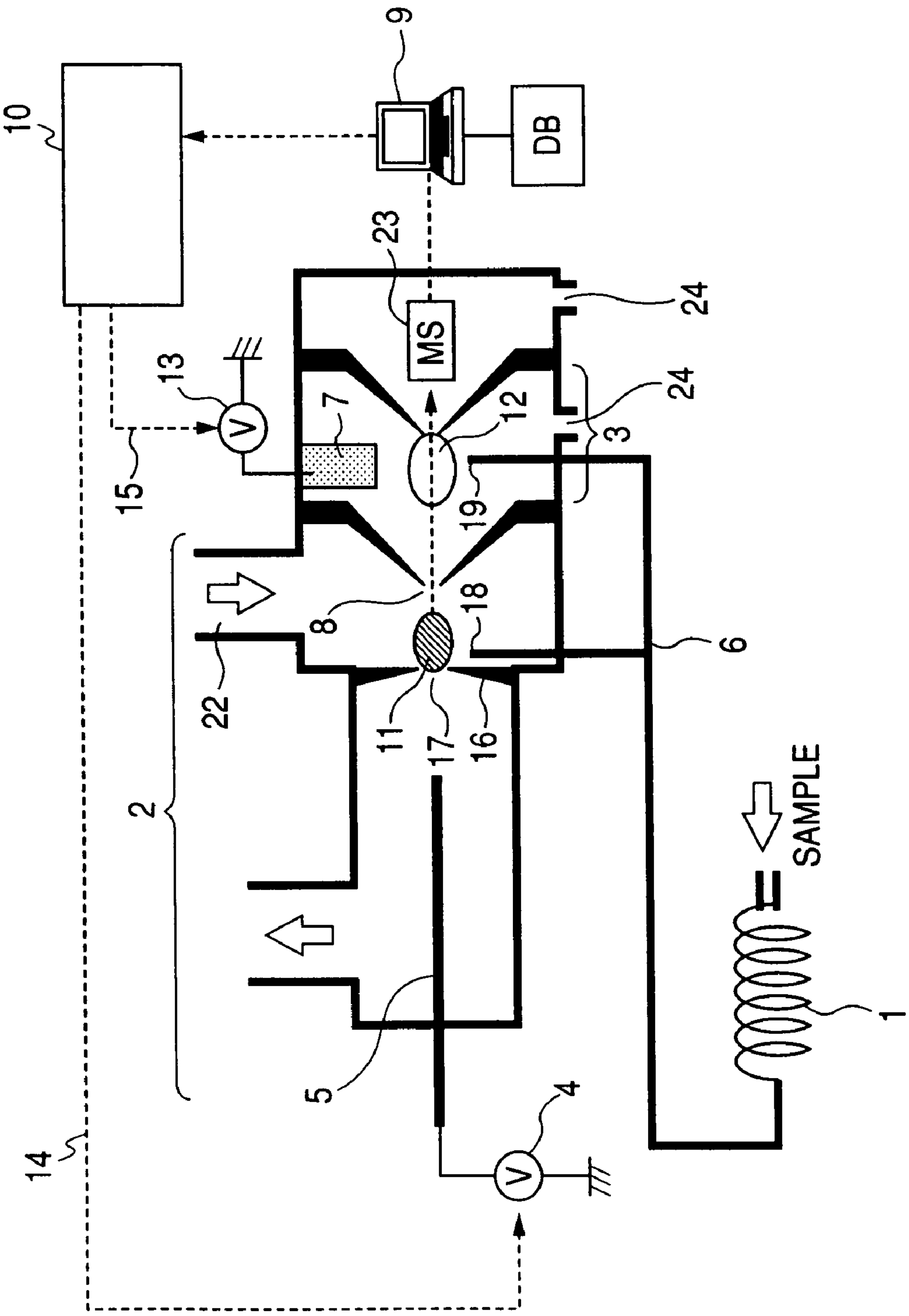
FIG. 2 is a view showing an example of the constitution with a differential pumping part being omitted between an APCI ion source and an EI ion source.

While the pressure in the APCI ion source is substantially at an atmospheric pressure and the pressure in the EI ion source 3 is at the order of $10^{-3}$ (torr), the differential pumping part may be omitted as shown in FIG. 2 in a case where the aperture 8 at the first stage is sufficiently small and the pressure in the EI ion source 3 can be kept at a level of $10^{-3}$ (torr).

In the embodiments shown in FIG. 1 and FIG. 2, the timing at which the ingredient separated by the GC column 1 is introduced to the APCI ion source 2 and the timing at which it is introduced to the EI ion source 3 are substantially simultaneous, and it is analyzed by switching APCI and EI within a period of time where one ingredient separated from the GC column is detected. The sample gas is divided and introduced simultaneously into the two ion sources and, since the sample gas ingredient introduced to the ion source not in use is exhausted without ionization, this is disadvantageous in view of the sensitivity.

Figure 3:
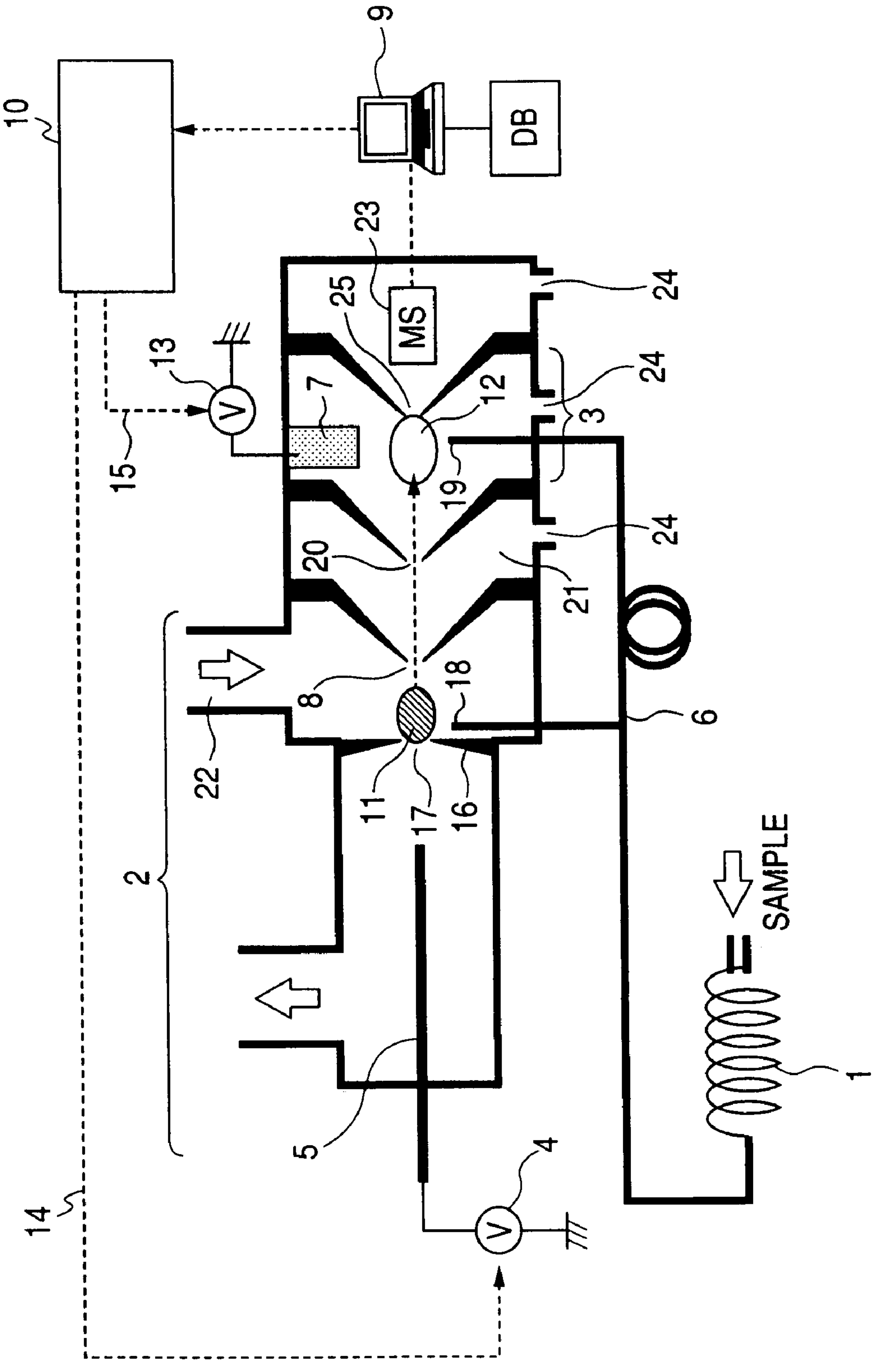
FIG. 3 is a view showing an example of the constitution in which the length of a GC column for introducing a sample to the APCI ion source and that to the EI ion source are different.

Then, as shown in FIG. 3, in a case where a time difference is provided to the column retention time after branching so that an identical ingredient is introduced into the EI ion source 3 after completing the elution of the ingredient introduced to the APCI ion source 2, the ingredient can be ionized efficiently by both of the ion sources. In this case, the difference of time in which identical ingredients are introduced into the two ion sources is preferably longer than the width of a detected peak. For the method of providing the time difference, it is a most simple method to change the column length after branching. For example, in a case of analyzing a micro-amount of acetone with a time difference between APCI and EI, by using a GC column: Porabond Q, manufactured by Varian Co having 0.53 mm diameter×10 m length and 10 μm thickness, at the temperature for an injection part of 200° C., a column temperature of 140° C. (constant), with helium as a carrier gas (82 kPa), since the retention time for acetone is 70 sec and the peak width is about 8 sec, the acetone ingredient can be introduced into the EI ion source 8 sec after detection in the APCI ion source, when the length after branching of the column for introduction to the EI ion source is made longer by 1.2 m.

In the example of FIG. 1, the sample gas introduced to the EI ion source 3 is separated from the sample gas introduced into the APCI ion source 2. In a constitution of not using tee 6 of the column and introducing the sample gas from the end 18 of the column by way of the APCI ion source 2 to the EI ion source 3 as in JP-A No. 11-307041, the sensitivity upon EI ionization is lowered as described below.

The gas introduced to the aperture 8 is a gas mixture of the discharge gas and the sample gas from the GC column and, assuming the flow rate of the gas introduced at the aperture 8 to the vacuum part as 300 [ml/min], the pore diameter of the aperture 20 as 0.9 [mm], and the pressures for the mid-differential pumping part 21 and the EI ion source 3 as 1 [Torr] and $4\times10^{-4}$ [Torr] respectively, the flow rate $Q_{20}$ [$Pa\cdot m^3/s$] of the gas passing through the aperture 20 is determined according to the following equation:

$$Q_{20}=C\times(P_1-P_2)$$

where C: conductance at the aperture 20 [$m^3/s$], $P_1$: pressure [Pa] in the mid-differential pumping part, and $P_2$: pressure [Pa] in the EI ionization chamber. In a case where the aperture 20 is an orifice, the conductance C can be approximately determined by the following equation:

$$C=116\times A$$

where A represents a hole area of an orifice and, since $A=\pi/4\times(0.9\times10^{-3})^2=6.36\times10^{-7}$ [$m^2$], $Q_{20}=9.8\times10^{-3}$ [$Pa\cdot m^3/s$].

For the amount of the gas introduced from the aperture 8: 300 [ml/min]=0.488 [$Pa\cdot m^3/s$], 2% of the amount is introduced into the EI ion source 3. Even when an entire amount of the sample gas introduced from the exit 18 of the GC column is contained in the amount of the gas introduced at the aperture 8, since only 2% thereof is introduced to the EI ion source 3, it may be considered that the sensitivity is insufficient in a case of analyzing a sample of a micro-level concentration. Then, it is important in view of the sensitivity to introduce the sample gas at a good balance separately to the APCI ion source and EI ion source as shown in FIG. 1.

Figure 4:
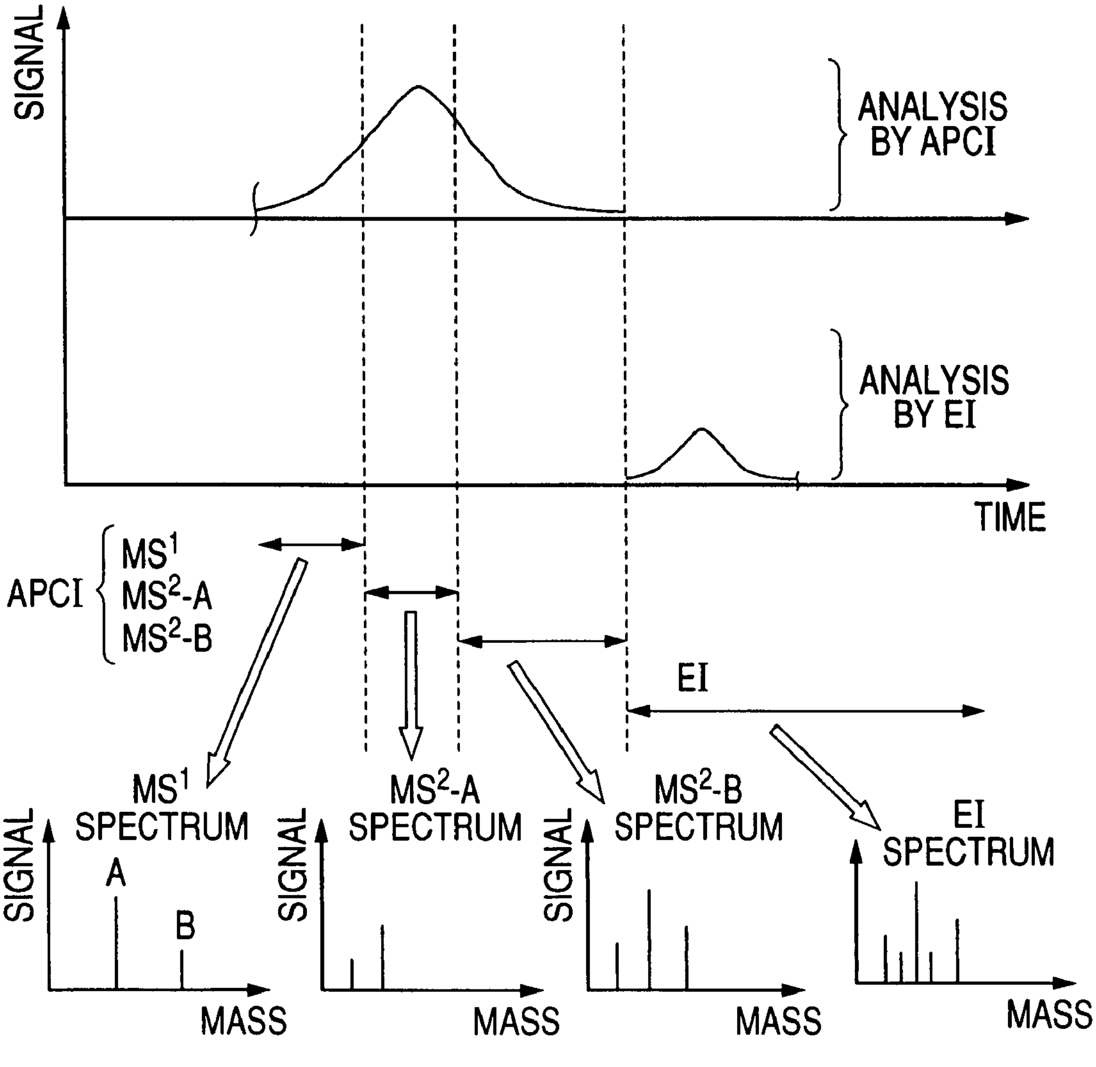
FIG. 4 is a view showing an example of analysis where APCI ionization and EI ionization are switched.

For example, in a case of FIG. 3, assuming the ion generation efficiency is identical between the case of measurement by APCI ionization and that of measurement by EI ionization, an amount of signal corresponding to the ratio of the flow rate introduced into the APCI and the flow rate introduced to the EI ion source is obtained. Then, in a case of analyzing sample at a micro-level of concentration, it is preferred to distribute the time and the flow rate analyzed in APCI and EI as shown in FIG. 4. FIG. 4 shows a GC separation peak in an enlarged scale and description is to be made to a case of using a mass spectrometer such as an ion trap mass spectrometer capable of MS/MS (tandem mass spectrometry) analysis. At first, mass spectrum is obtained by usual scan (described as $MS^1$) not using MS/MS in APCI ionization. Then, each of main peaks on the obtained mass spectrum (two peaks A, B in the case of FIG. 4) is subjected to MS/MS analysis (referred to as $MS^2$-A, $MS^2$-B).

After the completion of MS/MS analysis, the ionization method is switched from APCI to EI and mass spectrum by EI is obtained. In this way, in a case of conducting plural analysis for one ingredient, the flow rate introduced to the APCI ion source and the flow rate introduced to the EI ion source may be determined in accordance with the ratio of the number of analysis scanning.

That is, in a case of examples shown in FIG. 4, since the number of scanning is three for $MS^1$, $MS^2$-A, and $MS^2$-B (assuming the time necessary for measurement being substantially identical) in the analysis by APCI ionization, and it is one in the case of EI ionization, the introduction amount of the sample is allocated equally to each scanning by setting as: (flow rate introduced to the APCI ion source):(flow rate introduced to EI ion source) =3:1, and analysis can be conducted at a good balance. In the same manner, when the main peak is one in a case of analysis by APCI ionization, (flow rate introduced to the APCI ion source):(flow rate introduced to EI ion source)=2:1. Accordingly, it is preferred that the flow rate introduced to the APCI ion source is twice or more than the flow rate introduced to the EI ion source.

Figure 10:
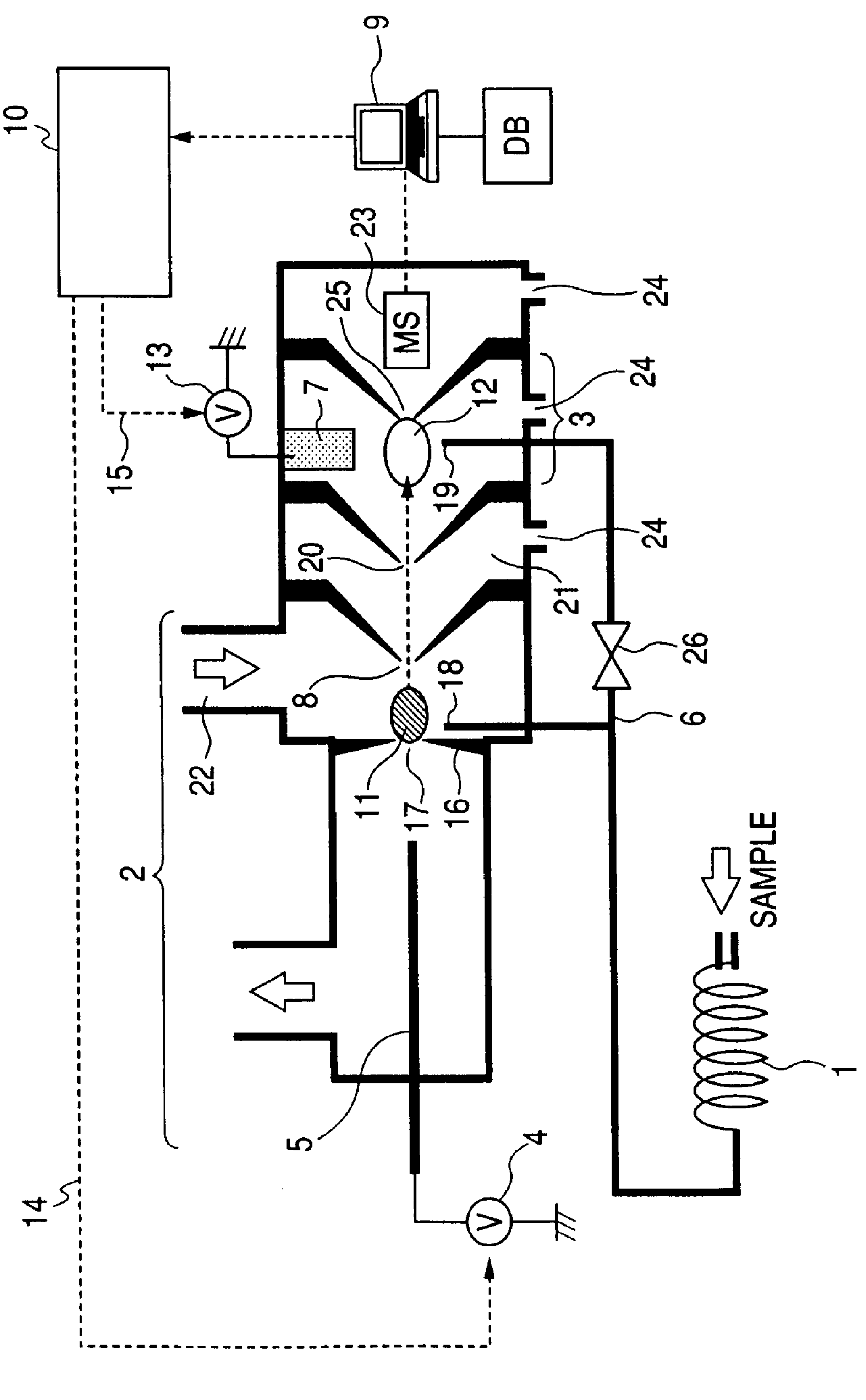
FIG. 10 is a view showing an example of the constitution for making time difference between APCI ionization and EI ionization.

For changing the flow rate, a valve 26 is provided to the column after a tee 6 as shown in FIG. 10. Alternatively, the flow rate can also be controlled by changing the diameter of the pipeline.

Figure 5:
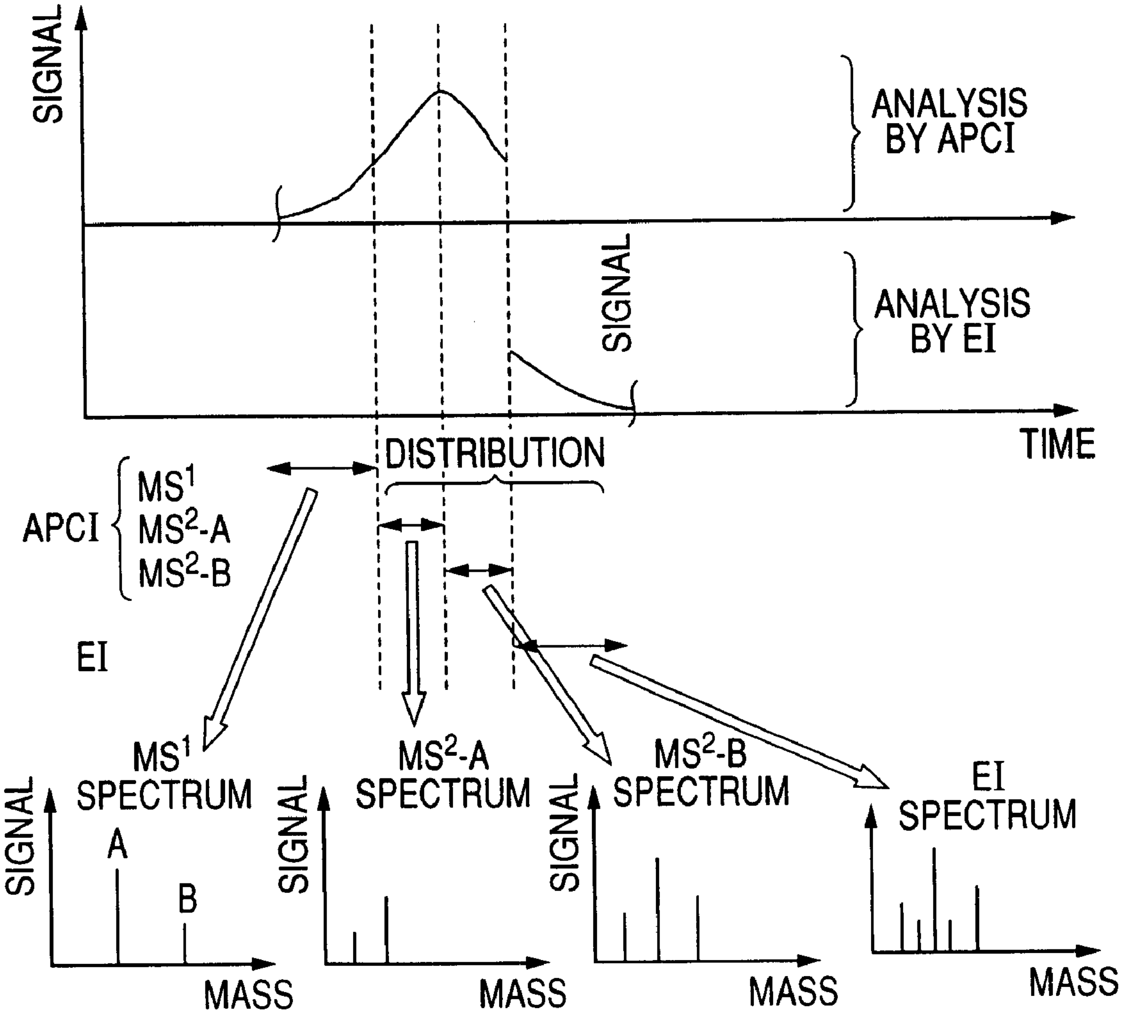
FIG. 5 is a view showing an example of analysis where APCI ionization and EI ionization are switched.

In a case of not providing the time difference as in the example of FIG. 1, analysis can be conducted at a good balance in view of the sensitivity by equally allocating the time necessary for each scanning of APCI and EI ionization relative to the period of time that the peak by the GC column separation appears. For example, in a case where a peak not aligned with the data base is detected by $MS^1$ in APCI ionization, and when two peaks are present on the $MS^1$ mass spectra, for obtaining three mass spectra of $MS^2$ spectrum ($MS^2$-A, $MS^2$-B) and EI spectrum for each of the peaks, a remaining peak width on the chromatography is equally divided to distribute the ion in-take time as show in FIG. 5.

Figure 6:
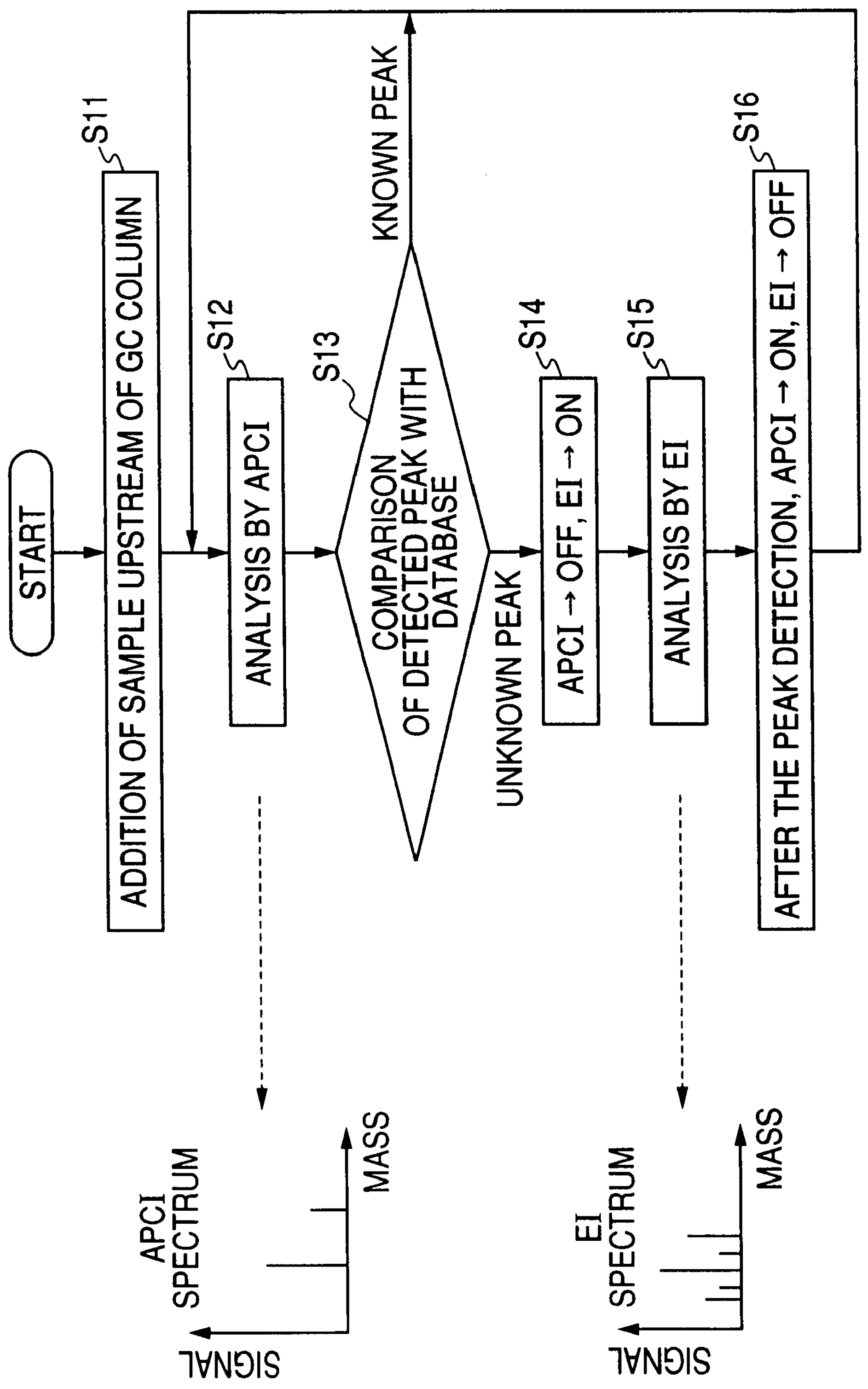
FIG. 6 is a flow chart for explaining an example of a measuring sequence.
Figure 7:
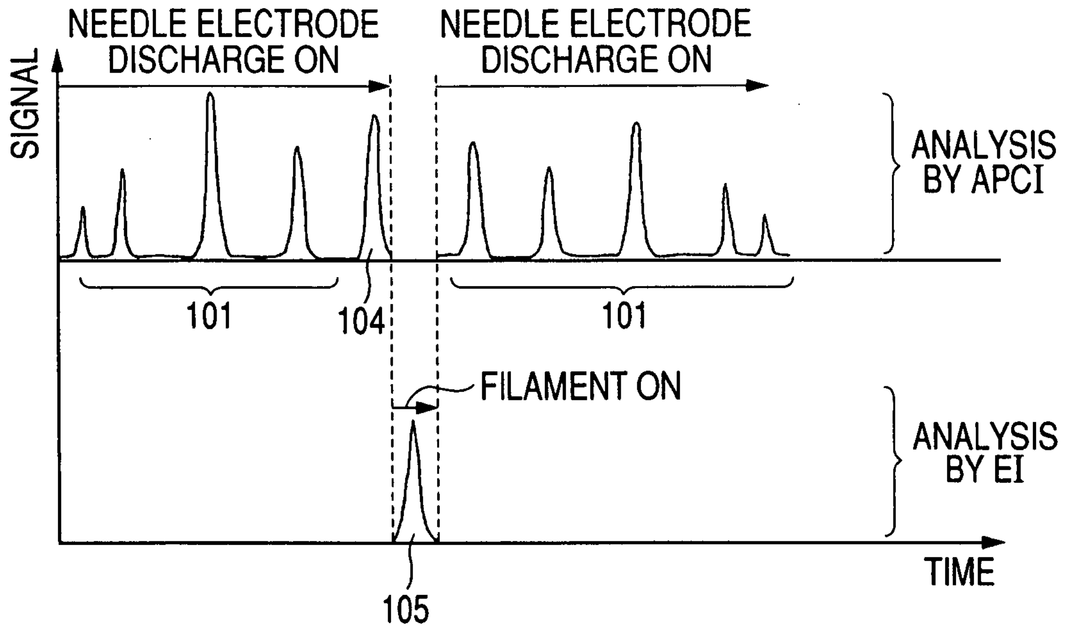
FIG. 7 is a view showing an example of analysis where APCI ionization and EI ionization are switched.

As shown in FIG. 3, when APCI ionization and EI ionization are switched with a time difference for the introduction time of the ingredient, unknown ingredient can be analyzed along the measuring sequence as shown in the block diagram of FIG. 6. FIG. 7 is a schematic view showing the state of detected peaks in this case.

At first, a sample is added to the upstream of the GC column (S11). APCI mass spectrum is obtained by turning-on the APCI ion source and turning-off the EI ion source (S12). The measured data is compared with the information in the previously obtained data base (S13) and, in a case where the spectrum of the detected peak 101 is known (aligned with the data base), measurement is continued as it is by APCI ionization. In the data base used herein, information for the mass spectra and the retention time of the GC column of standard samples are stored as data to confirm whether the mass spectrum obtained by analysis of the sample to be measured and the retention time are aligned with any of data in the data base or not. Then, in a case where the APCI mass spectrum for a peak 104 detected at a certain instance is not aligned with the data in the data base and the peak can not be identified, a switching signal for ionization is sent from the controller after the completion of elution of the peak to the APCI ion source, to turn the needle electrode power source off for the APCI ion source and to turn the filament power source to on for the EI ion source (S14). Then, after switching to EI and obtaining the EI mass spectrum for a peak 105 of the unknown ingredient eluted to the EI ion source, a switching signal is again generated from the controller to switch the mode to the APCI ionization by turning-on the needle electrode power source for the APCI ion source and turning-off the filament power source for the EI ion source (S16). Then, the process returns to step S12 and the APCI mass spectrum for the next elution peak is measured.

Figure 8:
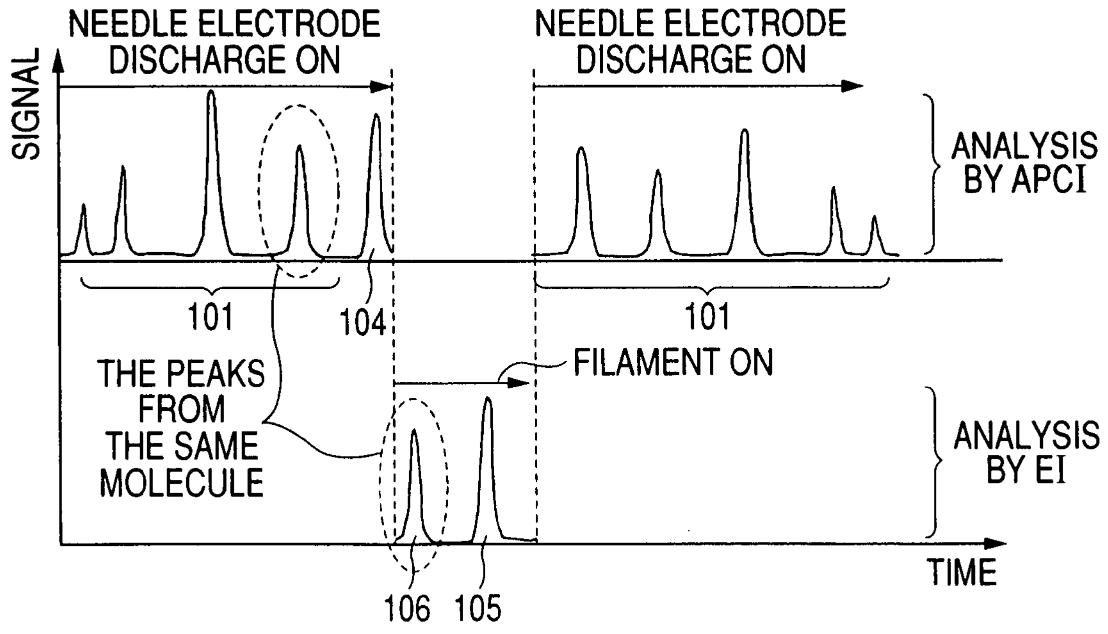
FIG. 8 is a view showing an example of analysis where APCI ionization and EI ionization are switched.

In a case where the time difference of introducing identical ingredients into two ion sources is large, after switching from APCI ionization to EI ionization, a peak which has been already confirmed to be aligned with the data base in APCI ionization may sometimes be detected as a peak 106 also in EI ionization as shown in FIG. 8. By registration also of the mass spectrum for the known ingredient by EI ionization on the data base, information whether this is a peak after confirmation in APCI ionization or not is obtained from the data base, it can be confirmed which peak is a peak for the unknown ingredient. In this way, the peak 104 for the unknown ingredient in APCI ionization can be eluted as a peak 105 to the EI ion source, which can be put to EI ionization to obtain the EI spectrum thereof.

The present invention can provide a mass spectrometer capable of analyzing a sample gas separated in GC by switching two kinds of ion sources at different pressure levels such as APCI and EI and capable of obtaining a large amount of information necessary for the identification of unknown ingredient (for example, GC-APCI/EI-MS), and mass spectrometry.

What is claimed is:

1. A mass spectrometry comprising the steps of:

separating a sample separated by gas chromatography into a first path and a second path;

introducing the sample in the first path into the first sample ion source, and introducing the sample in the second path into the second sample ion source situated downstream of the first sample ion source in the moving direction of the ions of the first sample ion source;

turning-on the first sample ion source while turning-off the second sample ion source and ionizing the sample ingredient eluted from the first path by the first sample ion source thereby measuring the mass spectrum;

turning-off the first sample ion source and turning-on the second sample ion source; and ionizing the sample ingredient eluted from the second path by the second sample ion source, thereby measuring mass spectrum.

2. A mass spectrometry according to claim 1, wherein the first sample ion source generates sample ions by atmospheric pressure chemical ionization and the second sample ion source generates sample ions by electron impact ionization.

3. A mass spectrometry according to claim 2, wherein tandem mass spectrometry is conducted in the step of measuring the mass spectrum by ionization in the first sample ion source.

4. A mass spectrometry according to claim 1, comprising a step of comparing a measured mass spectrum with a known mass spectrum subsequent to the step of ionizing in the first sample ion source, thereby measuring the spectrum, and conducting a step of measuring the mass spectrum in ionizing by the second sample ion source when the measured mass spectrum is not aligned with a known mass spectrum.

5. A mass spectrometry according to claim 1, wherein the sample ingredient introduced into the first sample ion source is introduced to the second sample ion source with a time delay by more than the peak width separated by the gas chromatography and, after ionizing an identical sample ingredient in the first sample ion source to measure the mass spectrum, the sample ingredient is ionized in the second ion sample source to measure the mass spectrum.

6. A mass spectrometry according to claim 5, wherein the flow rate of the sample flowing to the first sample ion source is more than the flow rate of the sample flowing to the second sample ion source.

7. A mass spectrometry according to claim 5, wherein the flow rate of the sample flowing to the first sample ion source is twice or more than the flow rate of the sample flowing to the second sample ion source.

8. A mass spectrometry according to claim 1, wherein the sample ingredient separated by the gas chromatography is introduced into the first ion source and the second ion source substantially simultaneously and, in a case where main peaks are contained by the number of n in the MS spectra obtained in the step of measuring the mass spectrum by ionization in the first sample ion source, the remaining elution time of the sample ingredient is equally divided into (n+1) sections, MS/MS spectrum for the main peak is obtained one by one during the first period by the number of n, and mass spectrum is measured by ionization in the second sample ion source within the last one period.

* * * * *